United States Patent Office 2,965,914
Patented Dec. 27, 1960

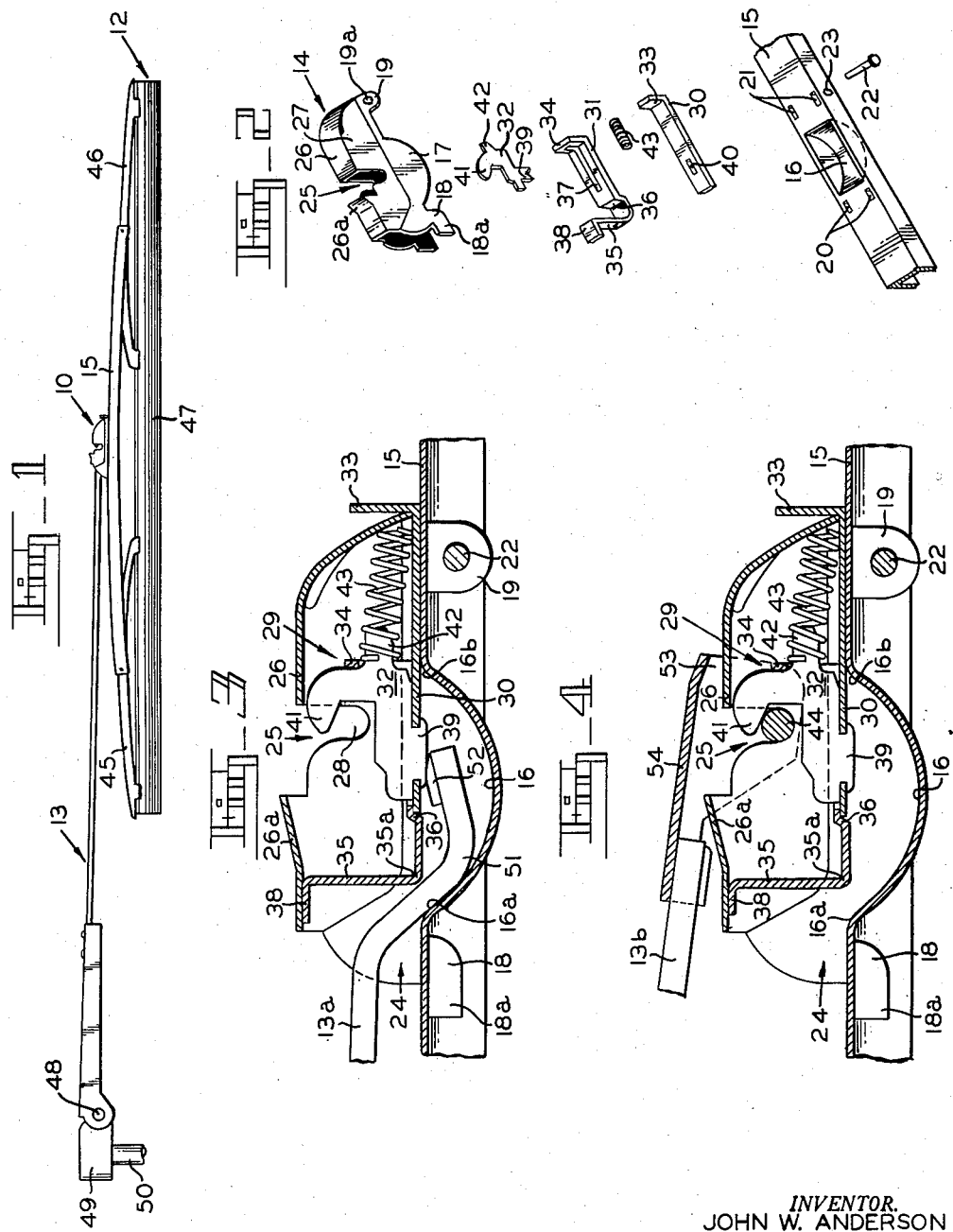

2,965,914
CONNECTOR FOR A WIPER ASSEMBLY
John W. Anderson, 578 Broadway, Gary, Ind.
Filed Oct. 18, 1955, Ser. No. 541,196
6 Claims. (Cl. 15—250.32)

The present invention relates to a connector for a wiper assembly and, more particularly, to a connector for attaching a wiper assembly to one of a plurality of differently constructed supporting arms.

In the art of cleaning or wiping a surface, such as a windshield surface of an automobile, the practice is to use a connector to join a wiper assembly, which includes a wiping element, to one end of a supporting arm. The arm oscillates about its other end, thereby causing the wiper assembly to traverse the surface. Because various supporting arms of differing structure are manufactured for this purpose, the connector must be so formed and shaped as to receive properly any one of the various types of supporting arms. This has resulted in an assortment of arms and matching connectors in which little or no interchangeability is possible. Accordingly, when a wiper assembly needs replacing, the automobile owner is left with the alternative of either purchasing a wiper assembly exactly like the worn one or buying an entirely new unit including a wiper assembly and supporting arm.

To provide a degree of interchangeability among the variously designed supporting arms and wiper assemblies, some so-called universal connectors have been suggested. These connectors are designed to join any one of several types of supporting arms to a wiper assembly. Heretofore, such connectors have themselves been relatively complicated in design. Moreover, some prior connectors have required additional parts, adaptors, or attachments which were sometimes needed to accommodate certain types of supporting arms.

The present invention provides an improved connector of very simple design and one which lessens the need for additional parts, such as an adaptor or like attachment, particularly for a supporting arm having either an arcuately shaped end, commonly referred to as the flat-hook type of arm, or a supporting arm having a pin, needle, or rivet, popularly referred to as the cross-bar type of arm.

The present connector receives either of the two types of arms just mentioned as well as other types of supporting arms and locks the wiper assembly thereto by a single movable member. In one form, the instant connector includes a housing secured to the wiper assembly. The housing has openings, each opening accommodating a different type of arm. A single movable member disposed within the housing is adapted for reciprocal longitudinal movement therein between locking and unlocking positions or stations with respect to the openings. The movable member may also define chambers within the housing, each chamber receiving one type of supporting arm. When the movable member or latch means is at the unlocking position, an arm may be freely inserted in or removed through one of the openings of the housing. When the latch means is at the locking position, the supporting arm is held within the selected chamber of the housing to effect a union between the wiper assembly and the supporting arm.

It is, therefore, a primary object of the present invention to provide a connector of simplified structure for attaching a wiper assembly to one of a plurality of differently constructed supporting arms.

Another object is to provide a connector that employs a single movable element to effect a locking relation with any type of supporting arm inserted therein.

A further object is to provide a connector which receives a supporting arm of either the cross-bar or hook type.

Yet another object of the present invention is to provide a connector including a housing having a latch means which moves within the housing between locking and unlocking positions and defines chambers in the housing, each chamber having an opening designed to receive a different type of supporting arm and wherein the latch means retains a supporting arm inserted into any one of the chambers when in the locking position.

Other objects are apparent from the following description of the invention and the appended drawing.

On the drawings:
Figure 1 is a side view of a wiper assembly joined to a supporting arm by the present connector.
Figure 2 is an exploded perspective view of the parts of the connector.
Figure 3 is a longitudinal section of the present connector and illustrates the manner in which the connector receives a supporting arm of the hook type; and
Figure 4 is a section similar to Figure 3 and shows the manner in which the connector receives a supporting arm of the cross-bar type.

As shown on the drawing:
The present connector, generally indicated at 10, is used to join a wiper assembly 12 to a supporting arm 13. As illustrated especially in Figure 2, the connector 10 includes a housing 14 which is secured to the wiper assembly 12 such as to a backing member or channel 15 thereof. To this end, the channel preferably has a cavity 16 provided with a concave, generally arcuately shaped bottom wall which cooperates with the housing as hereinafter described. The housing has depending sides 17, which abut against the sides of the cavity 16, and also a pair of lugs 18 and 19 at each end. Lugs 18 have hook portions 18a which enter at an angle through openings 20 in the channel 15 adjacent the cavity 16 and then underlie the bight section of the channel as the housing 14 is placed atop the channel 15. Lugs 19 have aligned apertures 19a and pass through openings 21 adjacent the opposite end of cavity 16. A pin or rivet 22 secures the housing to the channel by passing through the openings 19a and aligned apertures 23 in the legs of the channel 15.

The housing 14 has two openings through which supporting arms are inserted. One opening 24 is at an end of the housing, and the other opening 25 is in a top wall 26 disposed away from or spaced from the wiper assembly 12. Preferably, each opening is designed to receive a preselected type of supporting arm. Accordingly, opening 24 is substantially rectangular to receive the end of a supporting arm of the flat-hook type (Figure 3) disposed partially in the arcuately shaped cavity 16, as will be later described in greater detail. Opening 25 is also rectangular in the upper wall 26 of the housing but the sides 27 thereof are slotted as at 28 to receive a cross-bar type of supporting arm.

Regardless of the type of arm used with the present connector, the arm is locked within the housing 14 by a single movable member or latch means, generally indicated at 29. In the embodiment shown, the latch means consist of a lower plate or strip 30, an overlying latching plate or strip 31 for the opening 24, and a latching hook 32 for the opening 25, all of which are secured together to form the single movable member. More particularly, the plate or strip 30 is disposed within and transversely across the housing 14. The strip 30 extends exteriorly of the housing and terminates in an upright end 33 by which the latching means is moved longitudinally of the housing 14 between a locking position, as shown in Figures 3 and 4, and an unlocking position which is adjacent the right end of the housing as viewed in these figures. The end 33 also limits the movement of the strip 30 to the left.

The overlying latching plate or strip 31 has upturned ends 34 and 35 and an offset medial portion forming a shoulder 36. The shoulder seats against an end of the strip 30. A slot 37 extends longitudinally of the strip 31 and partially up the turned end 34 to receive the latching hook 32 as hereinafter described. The upturned end 35 terminates in an abutting portion 38 in sliding and guiding contact with the undersurface of the upper wall 26 of the housing as the strip or plate 30 is moved longitudinally thereof.

The latching hook 32 has a lug 39 which passes through the slot 37 and an opening 40 in the plate 30 and is then peened over or otherwise secured to the strip 30 to hold the described parts of the latching means 29 in assembly. A hook 41 extends toward the opening 25, and a finger 42 on the latching hook extends through the slot in the upturned end 34. A coiled spring 43 fits over the finger 42 and is thus interposed between the latching means 29 and the housing 14 to urge the former to the locking positions of Figures 3 and 4.

The wiper assembly 12 may be of any known structure. For example, it may be of the type described in Patent No. 2,596,063 to Anderson and comprise a primary bridge, pressure element, or channel 15 pivotally joined at its ends to secondary bridges 45 and 46. Each of the latter is in turn pivotally joined at its ends to a metal strip or flexor which suitably reinforces a rubber wipping blade 47. Similarly, the arm 13 may be pivoted at 48 to a conventional head 49 which is oscillated by a drive shaft 50 in a known manner.

In practice, the connector is opened to receive a supporting arm by pulling the upturned end 33 to the right as viewed in Figures 3 and 4. This compresses the spring 43 and uncovers the openings 24 and 25. If a flat-hook type of supporting arm 13a is used, as illustrated in Figure 3, the arcuately shaped end 51 which may have a nib 52 is inserted through the opening 24 and into the cavity 16, and the upturned end 33 then released. The spring 43 forces the latching means 29 to the left as viewed in Figure 3, so that the corner 35a of the upturned end 35 binds the arm and usually the curved end thereof against an edge 16a of the cavity 16.

Alternately, the end of the supporting arm 13a may be used to force the latching means 29 to the right and thereby uncover the opening 24 substantially with the insertion of the arm. In this regard, the present connector possesses an additional advantage. The openings in prior connectors are so restricted that the entering point of a supporting arm must be guided at least to some extent. However, in the present connector, it is emphasized that the opening 24 extends substantially through the entire height of the housing 14 and that the upturned end 35 is coextensive with this opening. Accordingly, the end of the arm 13a need not be guided. Instead, it may strike at any point along the upturned end 35, which thereby acts as an abutting wall, to move the latching means 29 to the right. Thereafter, the entering end of the arm 13a is pointed downwardly and inserted into the cavity 16. At this time, the nib 52 may also be used to cam the latching means 29 to the right and further facilitate the entry of the arcuately shaped end 51 into the cavity 16. In this way, the arm 13a is assured of an easy, positive insertion with respect to the connector. Regardless of the manner by which the latching means 29 is moved to the right, as viewed in Figure 3, the abutting portion 38 is forced to slide across the wall 26. To this end the wall may be slightly tapered or flared, as at 26a, to provide a wedging action.

If a cross-bar type of supporting arm 13b is used, the arm has a pin or rod 44 extending between sides 53 of an end attachment 54. With the latching means 29 retracted to the right as before, the pin 44 is dropped into the opening 25 and particularly into the slot 28 of the side walls 27, after which the latching means is again released. Alternately, the pin 44 may cam the hook 41 to the right by sliding along the convexly curved sides of the slots 28. The hook 41 engages the pin 44 as shown in Figure 4 and prevents the withdrawal of the arm 13b. At the same time, pin 44 prevents the hook member 32 from pivoting downwardly about the edge 16b of the cavity 16.

It will now be apparent that the present connector provides a simplified structure which readily connects a wiper assembly to one of a plurality of differently constructed supporting arms and can do so without the aid of auxiliary adaptors or additional attachments.

Various details of construction may be changed through a wide range without departing from the principles of this invention, and it is, therefore, not the purpose to limit the patent granted hereon otherwise than necessitated by the scope of the appended claims.

I claim:

1. A connector for attaching a wiper assembly to a supporting arm, including: an elongate housing adapted to be secured to the assembly having an opening at one end through which the arm may be received, a plate member within the housing adapted for longitudinal movement thereof between unlocking and locking stations, a closure member on the plate member tending to close said opening when said plate member is at the locking station, said closure member being an upturned extension on said plate member slidably engaging a part of the housing, and resilient means within the housing to urge the plate member toward the locking station.

2. A connector as claimed in claim 1 wherein said part of the housing making a sliding engagement with the extension on the plate member tapers toward the plate member in the direction of its movement toward the locking station to provide a wedging action attendant said movement, wherein said extension closure member acts as an abutting wall against which an entering supporting arm may strike to move the plate member longitudinally of the housing and to move said closure member away from its opening.

3. In an assembly for wiping a windshield surface, a member having a cavity and an elongate connector secured to the member over the cavity and adapted to attach the member to a supporting arm, said connector including a housing having an opening at one end through which the arm may be received, a plate member disposed within and extending transversely across the housing, means to move the plate member longitudinally of the housing between locking and unlocking stations, an upturned closure wall extending from the plate member, said plate member tending to cover said cavity and said closure wall tending to close off said opening when the plate member is at the locking station and prevent withdrawal of a supporting arm inserted through said opening and into the cavity, and resilient means within the housing urging the plate member and closure wall toward said opening.

4. In an assembly for wiping a windshield surface, a backing member in the assembly having a cavity provided with an arcuately shaped bottom and an elongate connector secured to the backing member over the cavity and adapted to attach the backing member to a supporting arm of the flat-hook type, said connector including a housing having an outer wall and an opening at one end through which the arm may be received, an elongate plate member disposed within and transversely across the housing, part of the plate member extending exteriorly of the housing and serving to move the plate member longitudinally of the housing from a locking to an unlocking station, a closure wall within the housing extending upwardly from the plate member and terminating in an abutting portion which slidingly engages said outer wall of the housing, said plate member tending to cover said cavity and said closure wall tending to close off said opening of the housing when the plate member is at the locking station and prevent withdrawal of such a supporting arm inserted through the opening and into the cavity, abutment means provided on the plate member intermediate its ends, and resilient means interposed between said abutment means and an end of the housing to urge the plate member and closure wall toward said opening.

5. In a wiper assembly, an elongate connector therefor having a single movable member for attaching the assembly to a supporting arm of the flat-hook type, said connector including a housing having an opening at one end adapted to receive the arm, said single movable member being disposed within the housing for longitudinal movement thereof and having latching means, said latching means having a configuration to engage effectively such an arm and an upturned closure wall adapted to close said opening and cooperating therewith to bind against the assembly such an arm when inserted into said opening, and means to move the single movable member to place said latching means in a locking position.

6. In combination: an elongate support having an outer wall and side walls, said outer wall being provided with two pairs of longitudinally spaced apertures and also being deformed to provide a seat inset between the side walls and said pairs of apertures, an elongate housing having a top wall and side walls having two pairs of fingers secured in the pairs of apertures, said housing also having an open end through which an entering part can be inserted for disposition on the seat, a manually responsive spring-pressed member movable in the housing to a locking position and an unlocking position having means for holding the entering part on the seat, and means carried by and extending from said member for engaging the top wall of the housing when the member is in a locking position to assist in holding the entering part on the seat.

References Cited in the file of this patent

UNITED STATES PATENTS

| | | |
|---|---|---|
| 2,432,691 | Smulski | Dec. 16, 1947 |
| 2,685,101 | Bell | Aug. 3, 1954 |
| 2,709,825 | Nesson | June 7, 1955 |
| 2,806,241 | Oishei | Sept. 17, 1957 |